INVENTOR
George H. Scherr

2,701,229
Patented Feb. 1, 1955

2,701,229

APPARATUS FOR THE CULTIVATION OF MICROORGANISMS

George Harry Scherr, Bound Brook, N. J.

Application October 2, 1950, Serial No. 187,875

1 Claim. (Cl. 195—142)

This invention relates to the procedure of cultivating microorganisms in an atmosphere which differs from that of the normal atmosphere. One form of the invention is illustrated in the accompanying drawings in which.

Certain of the features of this apparatus warrent its designation as a modified Petri dish.

Figure 1:
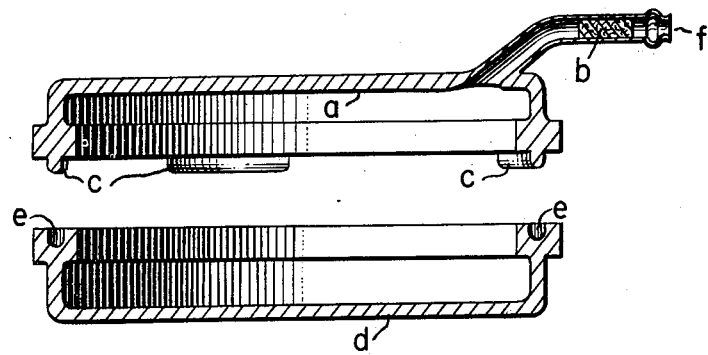
Fig. 1 represents a cross-section of the top and bottom parts of the apparatus.
Figure 2:
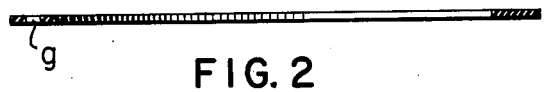
Fig. 2 is a vertical cross-section of the gasket to be interposed between the top and bottom parts of the apparatus.

A usual application of this invention is described herewith. In operation, the apparatus needs first be assembled. The top part of the apparatus $a$ as illustrated in Fig. 1 contains a number of ribs as shown by $c$ in Figs. 1 and 3. A gasket, illustrated in Fig. 4, and whose vertical cross-section is illustrated in Fig. 2, contains a number of holes, as illustrated by $g$, through which the ribs $c$ pass when the gasket is fitted to the top of the apparatus. The top of the apparatus with gasket attached is fitted to the botom part of the apparatus $d$, which contains grooves $e$ so constructed that they will correspond to and receive the ribs $c$ when the top and bottom sections of the apparatus are fitted together. The entire apparatus may now be sterlized by the use of an autoclave using steam under 15 lbs. of pressure for a period of 15 minutes, or some similar apparatus under suitable conditions of steam pressure and time of exposure required to effect sterilization. After the apparatus has been sterilized, a liquefiable gel-like substance or medium, whose composition depends upon the nutritional requirements of the organisms to be studied, is poured into the bottom part of the apparatus. The usual laboratory procedures of aseptic technique to avoid contamination of the medium with unwanted organisms from the atmosphere or surroundings are utilized. After the medium has solidified, the organisms to be studied are deposited onto its surface, again utilizing the usual laboratory procedures of aseptic technique. To the nozzle $f$ is attached a short piece of flexible tubing, to which is attached a pinchclamp, screwclamp, or similar device which can be used to block passage through the tubing. The tubing attached to the nozzle $f$ is attached to a vacuum pump or similar apparatus, and the air within the apparatus is thereby depleted, forming a partial vacuum. Evacuation of the air can proceed to any desired degree of anaerobiosis, which may be determined by the use of a manometer or other suitable instrument attached to the vacuum pump.

Figure 4:
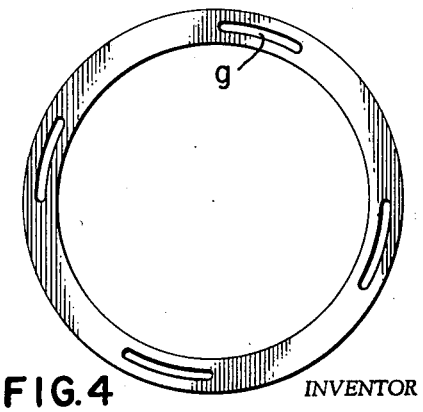
Fig. 4 is a bottom plan view of the gasket.

The gasket illustrated in Fig. 4 must, therefore, be constructed of rubber or other suitable composition in order to maintain an air-tight seal between the top and bottom sections of this apparatus when a pressure exists within this apparatus which is less than that of the atmosphere.

After evacuation of the air has proceeded to the degree desired, the pinchclamp or other such device is tightened so that passage through the piece of tubing attached to $f$ (as described above) is blocked. The apparatus can then be detached from the vacuum pump and incubated at any desired temperature.

In this way microorganisms which thrive best in the absence of free oxygen, generally referred to as anaerobes, and those which require an oxygen tension lower than atmospheric, known as micro-aerophils, may be cultivated.

An experimenter can, therefore, using this apparatus, subject a culture of organisms to a measured amount of anaerobiosis. This advantage is not shared by the apparatus known as the Brewer Anaerobic Culture Dish, which is described in the U. S. Patent No. 2,348,448, issued May 9, 1944; nor by the apparatus known as the Spray Anaerobic Culture Dish, which is described in the "Journal of Laboratory and Clinical Medicine," vol. XVI, No. 2, page 203, 1930; nor by the apparatus known as the Bray Anaerobic Culture Dish, described in the "American Journal of Clinical Pathology," vol. 13, No. 3 (March 1943), Technical Section, vol. 7, No. 2, page 31.

Another advantage of this apparatus over the culture dishes mentioned above is that any vapors or gaseous compounds, either alone or in any combination, can be introduced into it by first evacuating the apparatus by the procedure described above and then introducing through $f$ the desired vapor or gaseous compounds to any measured or estimated pressure less than that of the atmosphere.

This invention also obviates the necessity of incorporating into the medium reducing agents such as sodium thioglycollate, usually employed to reduce the oxygen tension in media used for the cultivation of anaerobes or micro-aerophiles. This advantage is especially important where the use of such reducing agents may modify the biochemical, morphological, or other characteristics of the microorganisms being studied.

This invention also has an advantage in that bulky jars, which are frequently employed in cultivating anaerobic organisms, are not required. Dishes which are contained in such large jars are not readily accessible for removal or observation.

Also, no additional sealing materials, such as waxes, petrolatum, or modeling clay, need be used to effect an air-tight seal.

It is occasionally required, in the course of the cultivation of microorganisms, to make transplants from time to time without the danger of contaminating the culture. With this invention, transfers of microorganisms may be made as follows:

Air is permitted to enter the dish and pass through a bacteriological filter, such as a fritted glass filter $b$, until atmospheric pressure within the apparatus is reached. There is no danger of contaminating the culture by permitting air, which invariably contains microorganisms, to rush into the plate, since the filter $b$ is so constructed as to prevent the passage of particles of the order or size of bacteria. Microorganisms from within the plate are now transplated, utilizing conventional laboratory sterile technique, the cover replaced, and the original conditions of vapor composition and pressure restored by the technique previously described. This ability to restore fixed conditions of vapor or gas composition and pressure to this apparatus as frequently as is required by the conditions of the experiment, without danger of contamination from air entering a system of reduced pressure, is a distinct advantage of this invention.

Figure 1A:
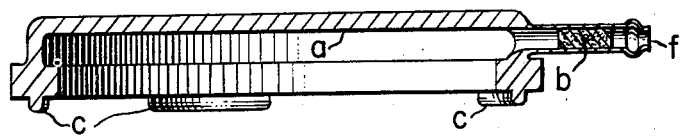
Fig. 1a is a cross-section of the modified top of the apparatus.

The side-arm $f$, in which the bacteriological filter $b$ is contained, may be attached to the top section of the plate as illustrated in $a$ of Fig. 1, or, if stacking of plates is desired, it may be attached as indicated in Fig. 1a. If $b$ is attached to the top of the plate as illustrated in Fig. 1a, the apparatus may either be incubated with $d$ as the bottom of the plate or inverted, with section $d$ as the top. The latter inverted position is frequently utilized in laboratory bacteriological work in order to avoid excess water of syneresis from accumulating on the surface of the medium and changing the characteristic colonial morphology of the organisms being studied.

Although this apparatus and parts thereof have been illustrated and described as being circular, it is obvious that this apparatus may assume other shapes in transverse cross-section without departing from the principles mentioned herein and as defined in the claims. Therefore, the invention is not restricted to dishes which are circular.

Figure 3:
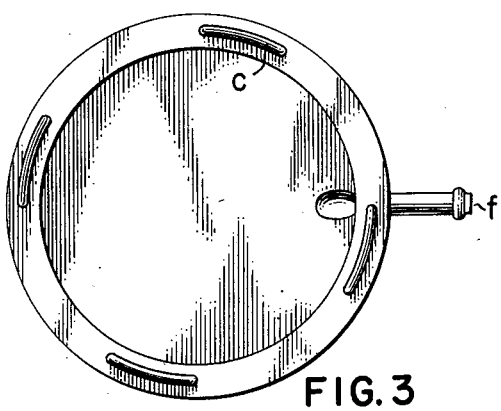
Fig. 3 is a bottom plan view of the top part of the apparatus.

Although the ribs $c$ as illustrated in Fig. 3 are but four in number as are the corresponding grooves $e$, it is obvious that other numbers of ribs and corresponding grooves may be used in the construction of this apparatus; however, not less than one rib and one groove may be used, without departing from the principles mentioned herein and as defined in the claim. Therefore, the invention is not restricted to dishes which contain four ribs or four grooves.

Having now set forth the objects and nature of my invention, what I claim as new and useful and of my own invention, and desire to secure by Letters Patent is:

An apparatus for cultivating microorganisms comprising a top and bottom substantially flat transparent rimmed plate the one having ribs and the other corresponding grooves, the said plates fitting together at the points of juxtaposition of the ribs and grooves to form an air-tight seal when a gasket is interposed between them, and one of the said plates having attached to it a tubular side-arm within which is contained a bacteriological filter so that vapors or gases entering said apparatus through said bacteriological filter contained in said tubular side-arm will be sterile.

References Cited in the file of this patent

UNITED STATES PATENTS

| | | |
|---|---|---|
| 2,519,902 | Haller | Aug. 22, 1950 |
| 2,533,088 | Brewer | Dec. 5, 1950 |

OTHER REFERENCES

Gershenfeld, Bacteriology and Allied Subjects, Mack Pub. Co., Easton, Pa., 1945, pages 74–76; 79–81.